July 31, 1934.     J. M. HARDESTY     1,968,447
UNDERGROUND CONDUIT
Filed March 1, 1933

INVENTOR
J. M. HARDESTY
BY J. MacDonald
ATTORNEY

Patented July 31, 1934

1,968,447

UNITED STATES PATENT OFFICE 1,968,447

UNDERGROUND CONDUIT

James M. Hardesty, East Orange, N. J., assignor to Bell Telephone Laboratories Incorporated, New York, N. Y., a corporation of New York Application March 1, 1933, Serial No. 659,087

4 Claims. (Cl. 25—156)

This invention relates to a method of manufacturing underground conduits and more particularly to a conduit having a multiplicity of rectangular, or other shaped channels therein which are formed longitudinally in sections of the underground conduit.

It is a well known fact that in the laying of conduits in trenches that certain obstructions are encountered, such as pipes and the like which extend across the path of the conduit and interfere with the continuous passage of said conduit. Inasmuch as the line of a multiple duct conduit can not readily be changed in order to avoid these obstructions, particularly on account of the size of the conduit and also the increased cost of digging a new trench and laying the conduit therein, the usefulness of such conduits has been somewhat impaired.

It is an object of this invention to provide a conduit which will overcome this difficulty by so adjusting the meeting edges of the conduit section to permit the construction of a line of conduits to avoid the obstruction by branching off from the main section of the conduit.

A further object of the present invention is to provide a method of making such conduits which is not only more economical but will make a mechanically stronger section than in the present method in which a section is held together by a wedge of clay introduced by hand and which is accordingly of different consistency from that of the body of the conduit.

A still further object of the invention is the provision of a multiple duct conduit which in the process of manufacture can be made so that it can be laid as straight as a straight conduit or arranged to provide a so-called expanded web.

Other objects and advantages of this type of conduit will be apparent from the following description when considered in connection with the accompanying drawing which illustrates one embodiment of the invention.

Referring now to the drawing.

Figure 1:
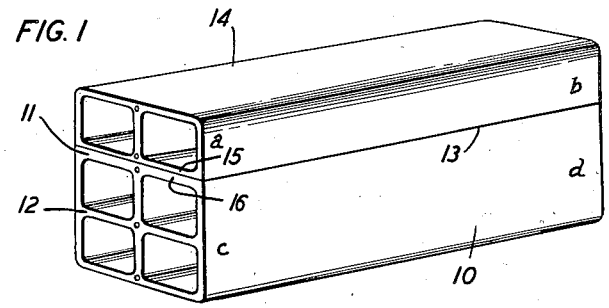
Fig. 1 is a view in perspective of a standard six duct conduit in which one of the webs is somewhat thicker than the other and illustrates how this web is cut longitudinally on an angle.
Figure 2:
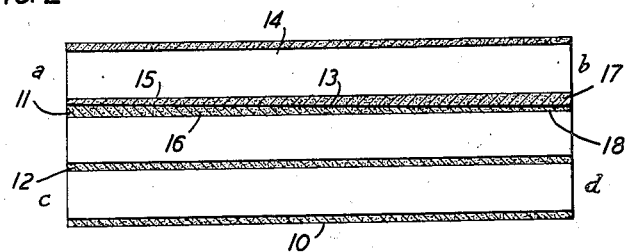
Fig. 2 is a longitudinal section of the conduit shown in Fig. 1.

Figs. 1 and 2 represent a six duct conduit section formed of "green" clay or other ceramic material which has been extruded by the well known process. In this section it will be noted that the conduit 10 is provided with cross webs 11 and 12, the web 11 being somewhat thicker than the web 12.

When the conduit section 10 leaves the extruding machine it is in its "green" form that is, it is plastic and workable.

The conduit section 10 after leaving the extruding machine is positioned on a suitable board or support and cut longitudinally on the line 13 as shown in Figs. 1 and 2, this being done by a wire cutter pulled lengthwise through the material and guided in any suitable manner.

The above cut 13 starts preferably near the top of the web 11 at the end $a$, and extends at an angle the full length of the conduit 10 to the other end $b$, thereby bisecting the web 11 as shown in Fig. 2. Due to the thicker web 11 being cut at an angle, there is provided at the end $a$ of the top section 14, a web or partition 15 which is somewhat thinner than the web 16, and at the end $b$ there is provided a web 17 which is somewhat thicker than the web 18.

After the conduit 10 has been cut as shown at 13 in Figs. 1 and 2, the upper section 14 is turned end for end, that is, the thinner web 15 at the end $a$ is placed in contact with the thin web 18 of the end $d$ of the lower section 19, thus providing that the end $a$—$d$, with a web or partition approximately the same thickness as the wall 20. The web or partition at the end $b$—$c$ will be approximately four times the thickness of the wall formed by the thin partition 15 and 18 at the end $a$—$d$ due to the webs 11 and 17 coming in contact with each other which being cut at an angle at their end portions are each approximately twice as thick as that of the walls 15 and 18.

Figure 3:
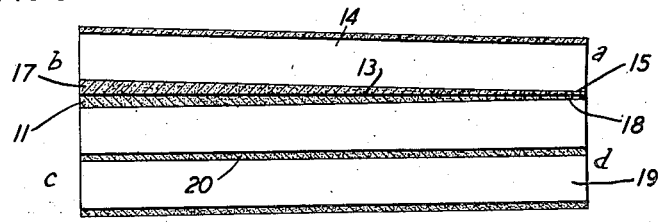
Fig. 3 is a longitudinal sectional view after the upper section has been turned end for end.

After the conduit has been prepared as shown in Fig. 3 it is burned in the usual manner.

Figure 4:
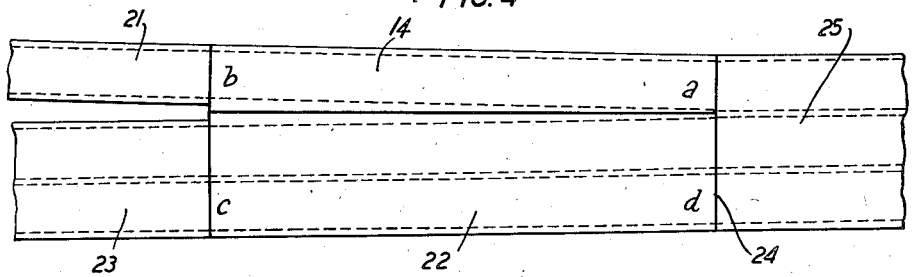
Fig. 4 is a plan view illustrating how a single duct multiple conduit joins the six-way conduit.

Fig. 4 shows a section of single conduit 21, branching off from a conduit 22 which has been manufactured in accordance with apppplicant's invention. The run 23 continues on in a straight line while the conduit 21 is splayed off to join another conduit or to avoid an obstruction whichever the case may be.

It will be noted that the end $a$—$d$ of the expanded web conduit 22 coincides perfectly with the ends 24 of the standard conduit 25.

It will be observed that in my improved expanded web conduit the walls of the conduit are not weakened, the thinnest walls of the web being approximately the same thickness as the web of the standard conduit.

It is obvious that many variations and modifications may be made in the conduit shown without departing from the spirit of the invention and is by this disclosure only to be limited by the appended claims.

What is claimed is:

1. A method of manufacturing multiple duct conduit and the like which comprises making a diagonal cut longitudinally through one of the walls of said conduit to form two sections, turning one of said sections end for end and uniting said sections.

2. A method of manufacturing multiple duct conduit and the like which comprises making one of the walls of said conduit thicker than the others, making a diagonal cut longitudinally through said wall to form two sections, turning one of said sections end for end and uniting said sections.

3. A method of manufacturing multiple duct web conduits and the like which comprises extruding a multiple duct conduit having internal webs therein, one of said internal webs being thicker than the remaining webs and cutting diagonally through said web the full length of said conduit to form two sections and then turning one of said sections end for end.

4. A method of manufacturing multiple duct conduits and the like having internal webs, one of said webs being substantially thicker than the remaining webs, making a diagonal cut longitudinally through said web to form two conduit sections and then turning said upper section end for end to provide a greater overall height at the one end while maintaining the standard height at the other end.

JAMES M. HARDESTY.